June 17, 1930.  C. F. CALLAHAN  1,763,646
COTTON HARVESTER
Filed Feb. 7, 1927  4 Sheets-Sheet 1

June 17, 1930.　　C. F. CALLAHAN　　1,763,646
COTTON HARVESTER
Filed Feb. 7, 1927　　4 Sheets-Sheet 3

INVENTOR
CHARLES F. CALLAHAN
by J.H. Weatherford
ATTORNEY.

June 17, 1930.  C. F. CALLAHAN  1,763,646
COTTON HARVESTER
Filed Feb. 7, 1927  4 Sheets-Sheet 4
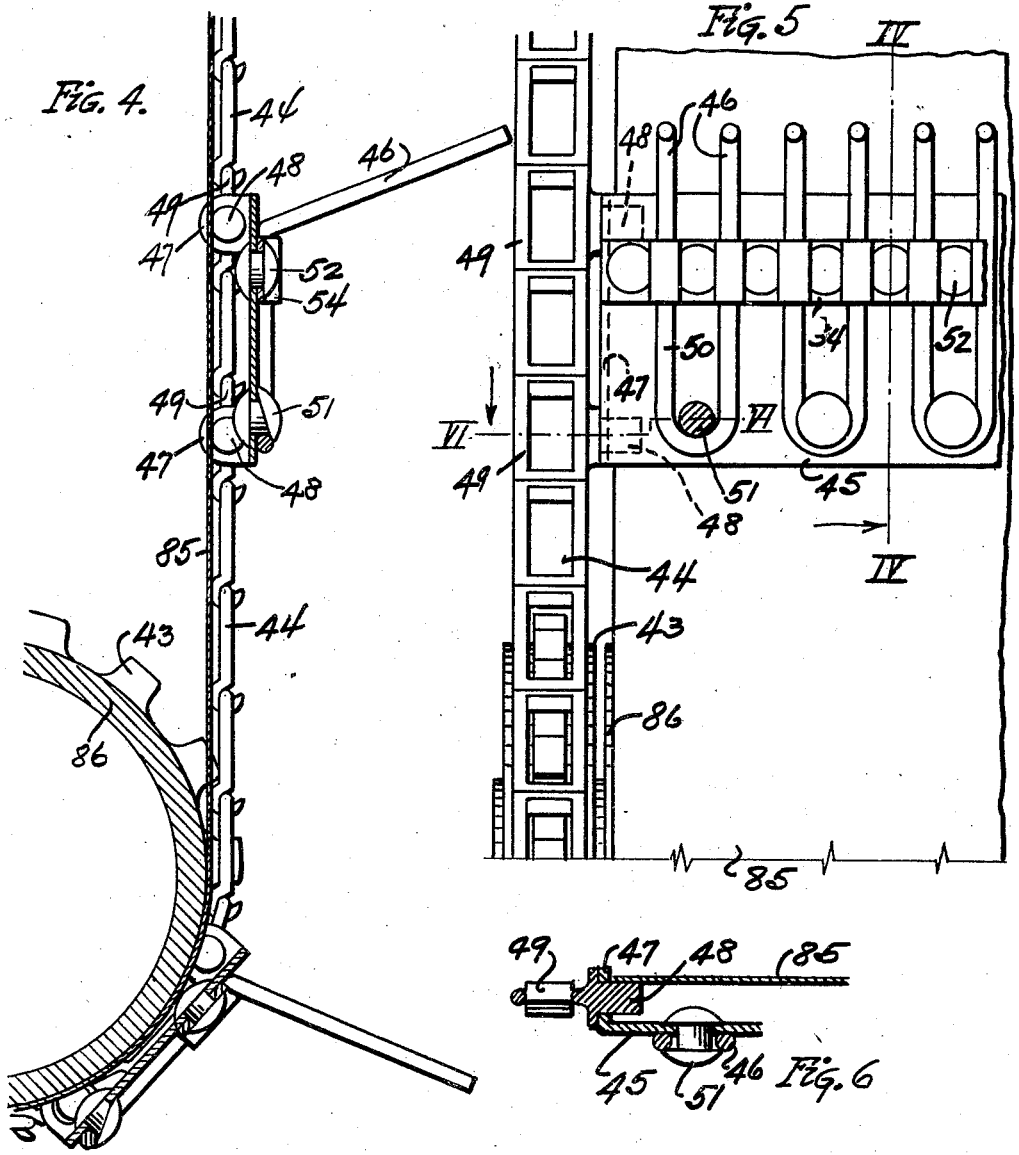
INVENTOR
CHARLES F. CALLAHAN
By J. H. Weatherford
ATTORNEY.

Patented June 17, 1930

1,763,646

UNITED STATES PATENT OFFICE

CHARLES F. CALLAHAN, OF MEMPHIS, TENNESSEE, ASSIGNOR TO CALLAHAN COTTON HARVESTER, INC., OF MEMPHIS, TENNESSEE, A CORPORATION OF TENNESSEE

COTTON HARVESTER

Application filed February 7, 1927. Serial No. 166,311.

This invention relates to a device for gathering cotton bolls with the cotton therein, either before same has fully opened, or thereafter.

Picking cotton is recognized as one of the principal expenses in connection with such a crop. It is often easy to secure pickers for gathering the earlier portions of the crop, but as the season advances, and the cotton matures more rapidly, sufficient labor is hardly ever obtainable and a very considerable part of the crop is left so long that it is damaged by rain. Also labor, being scarce, is at a premium, so that even though it is possible to secure such labor, the expense is often greater than the value of the crop will warrant. The crop ordinarily matures from the bottom of the plant toward the top, and fortunately damaging the plant by the breaking of twigs or limbs, has a tendency to cause more rapid and complete fruiting than might otherwise occur. Another fortunate thing in regard to the crop is that there is little tendency for the cotton to drop from the bolls unless it is rather violently disturbed, so that it is possible to allow a very considerable portion, if not all, of the crop to mature before gathering is necessary.

It has been found too, that the boll snaps off from the twig much more easily than the twig breaks, and that gathering of the cotton and the boll at the same time is a comparatively easy proposition. As the season advances, especially when frost hits the plants, the leaves drop off, leaving in many cases, only the fruit on the twigs. These factors taken as a whole, are conducive to the economical harvesting of the crop by machinery, as differentiated from the picking thereof either by hand or by machinery.

With these facts in view, among the objects of my invention, are:—

(a) To provide means for rapidly stripping the cotton from the plants;

(b) To provide means for delivering the cotton so gathered into a receptacle;

(c) To provide means for loosening up the cotton from the bolls and for breaking up such stalks or twigs as may be gathered along with the cotton;

(d) To provide means whereby such a machine will strip the cotton from both sides of the plant;

(e) To provide means whereby the strippers will automatically adjust themselves to varying sizes of plants;

(f) To provide means for regulating the height of the strippers above the ground; and (g) To generally improve the detail and construction of such a machine.

The means by which these and other objects are accomplished, and the manner of their accomplishment, will readily be seen from the following description on reference to the accompanying drawings, in which,—

Fig. 4 is a fragmentary sectional elevation taken on the line IV—IV of Fig. 5, looking in the direction of the arrow, and showing a portion of the belt, a side elevation of one of the chains and views of parts of two of the picker finger units.

Fig. 5 is a fragmentary elevation showing a portion of one end of one of the picker finger units and the means of attaching same to the carrier chain.

Fig. 6 is a section on line VI—VI of Fig. 5, showing a detail of one end of the picker finger plate, a portion of the belt and crosssection of one chain link.

Figure 1:
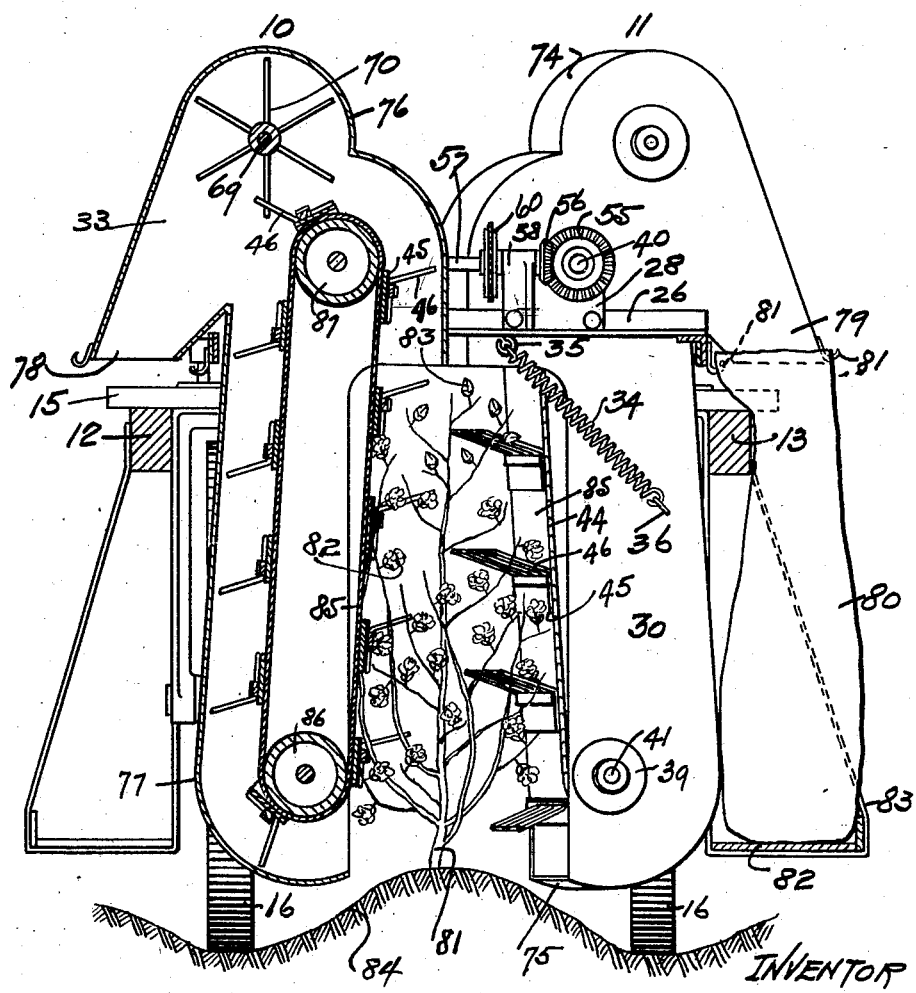
Fig. 1 is a sectional elevation of the machine taken on the line I—I of Fig. 2, looking in the direction of the arrow, and toward the rear end of the machine.
Figure 2:
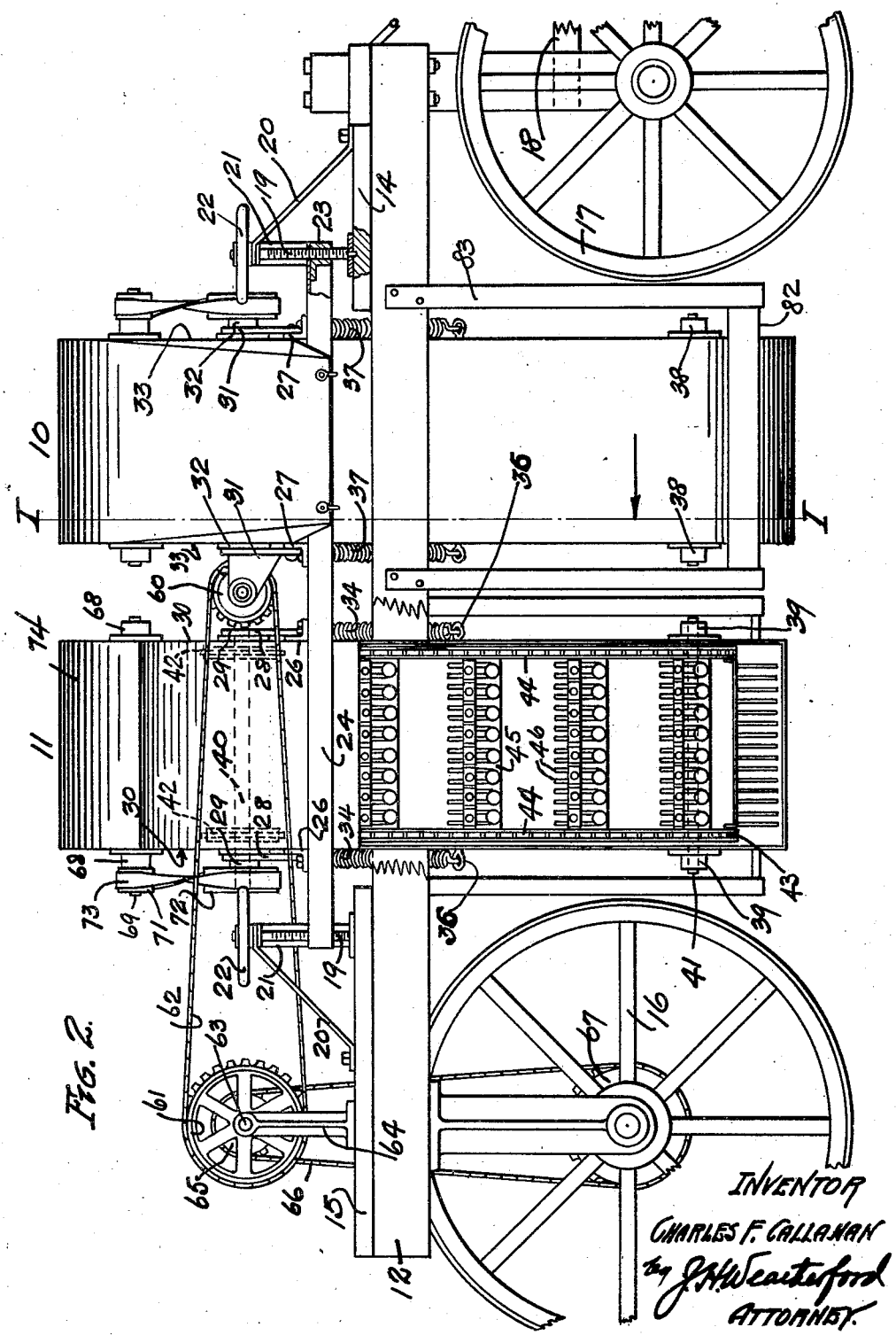
Fig. 2 is a side elevation of the machine with a portion of one of the side frames broken away to show the harvesting surface of one of the harvester units.

Referring now to the drawings in which the various parts are referred to by numerals, the preferred form of my device consists of two harvester units, 10 and 11, each designed to work on one side of a row of cotton, which units are disposed so that the harvester surfaces thereof face, but preferably one unit is mounted in advance of the other. These units are carried by a frame comprising side members 12 and 13, the front and rear ends of which are covered by flooring 14 and 15. 16 indicates a pair of rear wheels, 17 a pair of front wheels, 18 tongues or shaft members, to the latter of which a suitable draft mechanism may be secured. Supported by the floor are four screws 19, each suitably braced at the upper end, as by braces 20, 21 and preferably provided with a hand wheel 22. Each of these screws is provided with a nut 23 the four nuts supporting a rising frame made up of side members 24, 25, oppositely disposed, and pairs of cross members 26—26, 27—27. 28 are brackets which extend upward from the cross members 26, and support bearing boxes 29, secured to the sides 30 of the harvester unit 11. Similarly brackets 31 extend upward from the cross members 27 and support similar bearings 32 secured to the side members 33 of the harvester unit 10. These bearings may oscillate in the supporting brackets so that the harvester units 10 and 11 swung from these bearings, may swing inward and outward. 34 are springs, one end of which are secured to the cross members 26 as by eye bolts 35 and the other end similarly secured, as by eye bolts 36 to the sides 30 of the harvester unit 11. Similar springs 37 similarly connected, are provided for the unit 10. By these springs the lower end of the unit, in each case, is swung inward around the respective brackets 29 and 32 as centers.

Near the lower end of the unit 10, are oppositely disposed bearings 38 also secured to the side members 33 thereof, and similarly bearings 39 are secured to the side members 30 of the unit 11. Mounted in the bearings 29 are head shafts 40 and in the bearings 39 tail shafts 41, the former of which carry driving sprockets 42 and the latter of which carry tail sprockets 43. Disposed on these sprockets are endless chains 44, which carry the opposite ends of cross members 45, which carry harvester fingers 46.

The detail of the attachment of these cross members and fingers will be more readily understood by reference to Figs. 4, 5 and 6, by reference to which, it will be seen that the ends 47 of the cross members 45 are bent at right angles to these members and are carried by pins 48 which project laterally from links 49 in the chain 44, a similar pair of links carrying the opposite end of the member 45. Preferably in order to provide rigidity of the fingers 46, a pair of these fingers is provided with a unitary U shaped shank 50 which U shaped shank is bent at an angle to the fingers and may be secured to the member 45, as by rivets 51, 52. Preferably the rivets 52 secure the finger shanks 50 through the intermediary of a corrugated or crimped strip 54, which serves additionally as a spacing means to definitely determine the spacing of, and hold the fingers to, their proper spacing.

Each of these cross members and the fingers carried, form a group of fingers or rake which strips the bolls and cotton from the plant when moved upward therethrough. Mounted on the shaft 40, is a beveled gear 55, which meshes with and is driven by a bevel gear 56, which latter gear is mounted on and secured to a shaft 57 journalled in bearings 58, 59, carried by the brackets 28, 32 respectively. Also secured to the shaft 57 is a sprocket wheel 60, which is driven from a sprocket 61, by means of a chain 62. The sprocket 61 is carried by and secured to, a cross shaft 63, mounted in suitable bearings in brackets 64, which are fastened to the floor 15. Also mounted on and secured to the shaft 63, is a sprocket 65 which is driven through a chain 66 from a sprocket 67 on one of the rear wheels 16.

Mounted on the sides 30 of the unit 11, are bearings 68 in which a shaft 69 is journalled. This shaft 69 carries a beater 70 and is driven by a pulley 71 from a larger pulley 72 on the shaft 40, through a cross belt 73.

The mechanism contained within the unit 10 is identical with that hereinbefore described for the unit 11. An upper cover 74 connecting the upper part of the sides 30 of the unit 11, and a lower cover 75, connecting the lower portion of the sides 30 together with these sides, form the housing for the unit 11, and similarly an upper cover 76 connecting the upper portion of the sides 33 and a lower cover 77 connecting the lower portion of these sides complete the housing of the unit 10. 78 is a discharge spout from the unit 10, and 79 a similar discharge spout from the unit 11. 80 is a sack used as a receptacle for the discharge from the spout 79. This sack may be supported at its upper end as by hooks 81 and at its lower end rests on a platform 82 supported by suitable hangers 83 from the frame side member 13. A similarly secured, similarly supported sack, may be hung to receive the discharge from the spout 78.

81 indicates a cotton plant, 82 open bolls thereon, and 83 unopened bolls. It is purposed to make the spaces between the fingers less than the unopened boll diameter, whereby such boll or the larger open bolls will be caught by these fingers and stripped from the plant.

84 indicates the ground surface shown with the rows raised above the general ground level.

Immediately in the rear of the cross members 45 carrying the picker fingers 46, is a belt 85 carried by upper and lower drums 86 and 87. This belt may be fastened to the cross members should it be so desired, but ordinarily runs sufficiently close thereto as to make this unnecessary. Cotton and bolls stripped off by the fingers is retained thereon by this belt.

Figure 3:
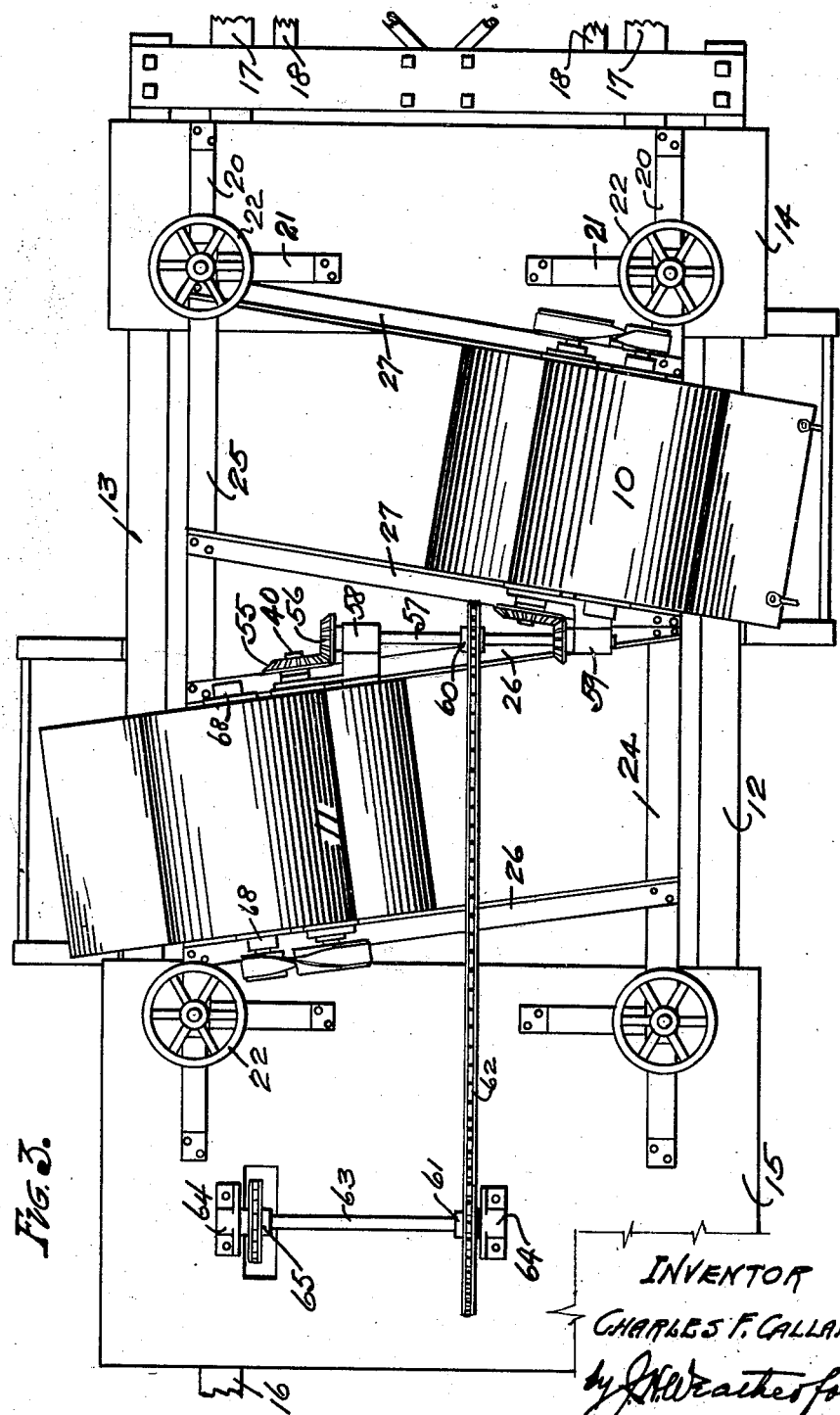
Fig. 3 is a plan view of the machine.

It will be noted from the plan Fig. 3 of the machine that the forward portion of the units is placed further from the row center than the back thereof, thus facilitating the engagement of the picker assembly with the plant.

In operation the machine is used with the wheels on either side of the cotton row. The height of the harvester units are adjusted by means of the screws 19, so that the bottoms of the units will come as close to the surface of the ground as possible, without their dragging thereon. This adjustment is especially necessary since sometimes the cotton is planted in raised rows, whereas at other times the ground surface is approximately level. Ordinarily this adjustment need only be made once in a particular field, since the method of cultivation followed is ordinarily carried out at least over each field.

After this adjustment is made the machine is moved forward by any suitable or desired traction means. Rotation of the rear wheels acting through the sprocket chains 66 and 62 drives the cross shaft 57 from which the head shafts of both units are driven by means of the bevel gears. The sprockets carried on these head shafts draw the chains 44 up and therefore cause the picker fingers 46 to be similarly carried upward in the manner required, these fingers penetrating between the limbs of the cotton plant approximately to the center of the row and in passing upward pulling off from the limbs all cotton bolls whether open or unopened, which come within their path.

It will be understood that there is not only an upward motion of these fingers through the plant, but inasmuch as the machine is moving forward there will also be a forward motion which tends to bend the main stem of the plant forward. It is necessary therefore that the upward speed of the picker fingers be considerably greater than the forward speed of the machine and this therefore has been provided for. Should a large or bushy plant, or one out of line be encountered, the springs 34, 37 as the case may be, will permit the lower portion of the unit to swing outward as may be necessary and thereafter swing it inward to place. The fingers on the belt carry the cotton harvested upward and over the head drums. As it passes over these drums it comes within the path of the beater 70 the fingers of which are moving at a more rapid rate than the picker fingers 46.

This beater serves the double purpose of throwing the cotton from the belt outward through the discharge spout 78 and also dislodges the cotton in many cases from the bolls and breaks up and off any stems or twigs adhering thereto, thus greatly facilitating later cleaning. From the spout 78, 79, the cotton drops into the bags 80 or other suitable receptacles and as these are filled they are removed from the machine and new ones substituted.

It will be understood that the drawings herein are illustrative only, as for instance, the harvester units in these views are shown as driven directly from the rear wheel whereas any other suitable source of power may be substituted for such drive.

It is distinctly understood that the other details of construction are similarly illustrative and that it is not my intention in the claims to limit myself to such detail.

Having thus disclosed my invention, what I claim is:—

1. In a cotton harvester, a wheeled frame, a secondary frame supported thereby and vertically adjustable with respect thereto, said frame including two angularly disposed sets of parallel transverse members, a bracket carried by each transverse member, a picker unit swung from the pair of brackets of each set, means for urging the lower ends of said picker units inward and means for driving said picker units.

2. In a cotton harvester, a wheeled frame, a secondary frame supported thereby and vertically adjustable with respect thereto, said frame comprising a forward set of parallel transverse members and a rear set of parallel transverse members, said sets being disposed angularly with respect to each other, and stripper units, each swung from a pair of said parallel members, and disposed on either side of and facing the longitudinal center of said machine, whereby said stripper units will successively operate on each plant.

3. In a cotton harvester, a wheeled frame, a secondary frame supported thereby and vertically adjustable with respect thereto, said frame including two angularly disposed sets of parallel transverse members, a bracket carried by each transverse member, a picker unit swung from the pair of brackets of each set, and facing the longitudinal center of the machine, means for urging the lower ends of said picker units inward and means for driving said picker units.

4. In a cotton harvester, a plurality of picker finger groups, and means for bracing and moving said finger groups upward including a pair of parallel sprocket chains spaced apart, each carrying at the same intervals pairs of links having each a pin projecting toward and in alignment with the pin on the link opposite; said finger groups each comprising a transverse plate disposed between but outward from said chains, said plate having at each end an inwardly turned portion provided with two holes spaced apart to conform to the pin spacing of said links and adapted to be received on and carried by said pins, and a plurality of stripping fingers carried by said plate.

5. In a cotton harvester, carrying means, housing supported thereby, upper and lower shafts journalled in said housings, driving means therefor, sprockets spaced apart on said shafts, a pair of parallel sprocket chains carried by said sprockets, each chain carrying at the same intervals pairs of links having each a pin projecting toward and in alignment with the pin on the link opposite, and finger groups each comprising a transverse plate disposed between but outward from said chains, said plate having at each end an inwardly turned portion provided with two holes spaced apart to conform to the pin spacing of said links and adapted to be received on and carried by said pins, and a plurality of stripping fingers carried by said plate.

In testimony whereof I have hereunto set my name.

CHARLES F. CALLAHAN.